United States Patent
Kropf-Eilers

(10) Patent No.: US 7,954,632 B2
(45) Date of Patent: Jun. 7, 2011

(54) CONVEYOR BELT HAVING REPLACEABLE SEGMENTS

(75) Inventor: Adolfo Kropf-Eilers, Seevetal (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 328 days.

(21) Appl. No.: 12/085,094

(22) PCT Filed: Feb. 16, 2006

(86) PCT No.: PCT/DE2006/000283
§ 371 (c)(1),
(2), (4) Date: Nov. 17, 2008

(87) PCT Pub. No.: WO2007/056966
PCT Pub. Date: May 24, 2007

(65) Prior Publication Data
US 2009/0272633 A1    Nov. 5, 2009

(30) Foreign Application Priority Data
Nov. 16, 2005   (DE) .......................... 10 2005 054 481

(51) Int. Cl.
*B65G 43/00* (2006.01)
(52) U.S. Cl. .............. 198/847; 198/810.01; 198/810.03; 198/502.1
(58) Field of Classification Search .................. 198/846, 198/847, 502.1, 810.01–810.04
See application file for complete search history.

(56) References Cited

U.S. PATENT DOCUMENTS

| | | | |
|---|---|---|---|
| 4,087,800 A * | 5/1978 | Lee | 340/676 |
| 4,587,852 A | 5/1986 | Butler et al. | |
| 4,621,727 A * | 11/1986 | Strader | 198/810.02 |
| 4,925,012 A | 5/1990 | Guntensperger | |
| 5,168,266 A * | 12/1992 | Fukuda | 340/676 |
| 6,047,814 A * | 4/2000 | Alles et al. | 198/810.02 |
| 6,264,577 B1 * | 7/2001 | Hutchins | 474/106 |
| 6,291,991 B1 | 9/2001 | Schnell | |
| 6,352,149 B1 * | 3/2002 | Gartland | 198/810.02 |
| 6,484,872 B1 | 11/2002 | Jepsen et al. | |
| 7,259,854 B2 | 8/2007 | Schnell | |

FOREIGN PATENT DOCUMENTS

| | | |
|---|---|---|
| DE | 1 148 181 | 5/1963 |
| DE | 19 40 945 | 3/1971 |
| DE | 10 2004 041 705 | 3/2005 |
| EP | 1 053 447 | 11/2000 |
| EP | 1 064 209 | 1/2001 |
| JP | 54-113172 | 9/1979 |
| WO | WO 99/41567 | 8/1999 |
| WO | WO 99/47437 | 9/1999 |

OTHER PUBLICATIONS

International Search Report, 2006.

* cited by examiner

*Primary Examiner* — Mark A Deuble
(74) *Attorney, Agent, or Firm* — Collard & Roe, P.C.

(57) ABSTRACT

The invention relates to a conveying belt which is made of elastomeric material and has a load-bearing side (2) for the conveying material and a running side and, in particular, has a reinforcing support embedded within the conveying-belt core, wherein the conveying belt has at least one exchangeable part, wherein the invention provides for the exchangeable part to be a segment (6) which has a small surface area in relation to the load-bearing side (2) and/or running side as a whole and comprises a component support (7) and information carrier (8), the component support and information carrier forming a dedicated unit.

20 Claims, 6 Drawing Sheets

CONVEYOR BELT HAVING REPLACEABLE SEGMENTS

CROSS REFERENCE TO RELATED APPLICATIONS

Figure 1:
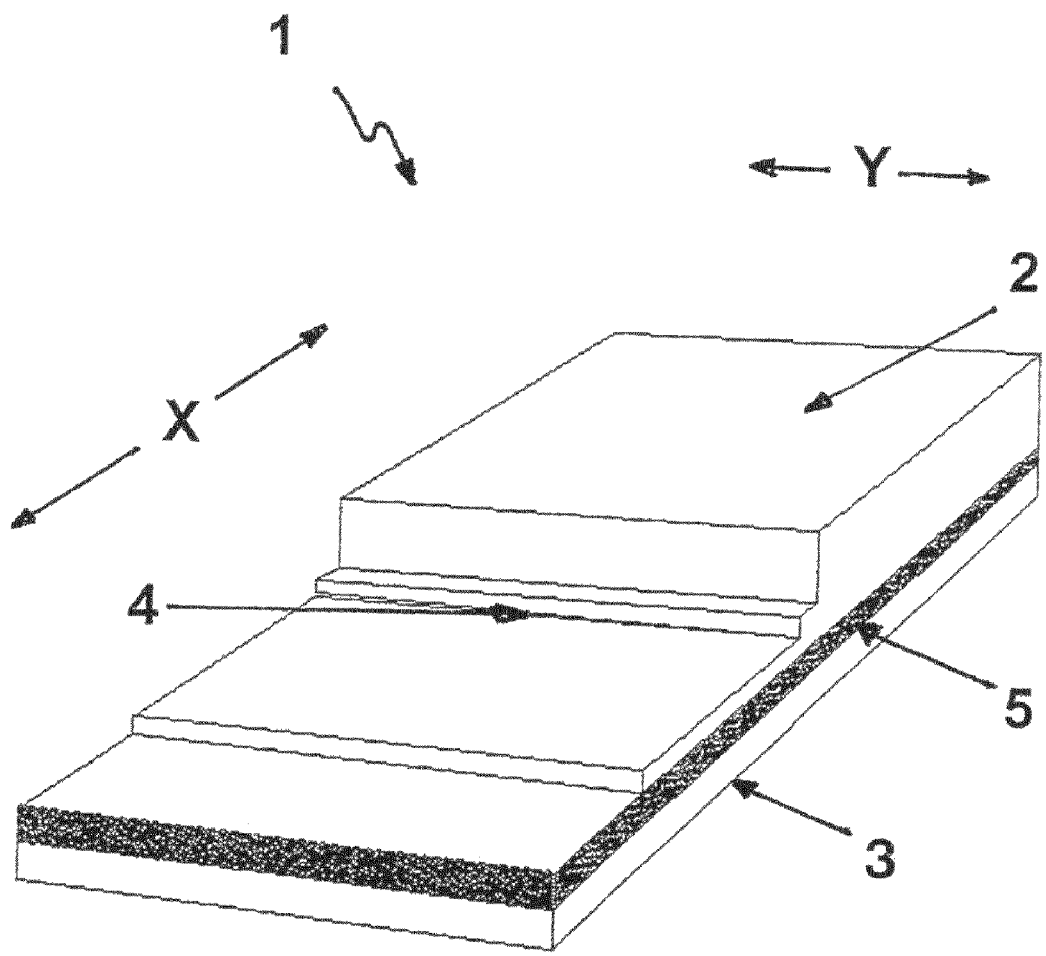

This application is the National Stage of PCT/DE2006/000283 filed on Feb. 16, 2006, which claims priority under 35 U.S.C. §119 of German Application No. 10 2005 054 481.9 filed on Nov. 16, 2005. The international application under PCT article 21(2) was not published in English.

The invention relates to a conveyor belt made of elastomer material, having a carrying side for the material to be conveyed, and a running side, as well as, in particular, an embedded strength support (e.g. steel cables, woven fabric) within the conveyor belt core, whereby the conveyor belt has at least one replaceable part.

A conveyor belt of this type is known from the patent EP 1 064 209 B1. In this connection, the conveyor belt comprises a center part and two side parts, with reference to its total width, whereby the center part is replaceable, specifically using a connection to the two side parts. In this manner, it is possible to remove a worn or damaged center part of a conveyor belt, and to replace it with a new center part. The two side parts, in contrast, continue to be used without being replaced.

In the Auslegeschrift [examined and published patent application] DE 1 148 181 B, a tube belt conveyor system is described, in which the longitudinal profile strips, which are subject to wear, can be replaced by means of releasable tension organs, while the conveyor belt continues to be used.

In recent years, comprehensive development work has been done with regard to devices for monitoring conveyors. In this connection, detectable elements are vulcanized into the conveyor belt as data carriers, whereby a scanning unit (detector) detects and evaluates the belt-specific data without making contact.

A device for continuous monitoring of a connection of a conveyor belt is known from EP 1 053 447 B1, whereby measurement markers are disposed in the region of the beginning of the connection and the end of the connection, respectively. Outside of the connection region, an address for the purpose of identifying the measurement location is disposed in the vicinity of the beginning of the connection and/or the end of the connection.

A device for monitoring a conveyor is described in the Offenlegungsschrift [examined patent published for public scrutiny] DE 10 2004 041 705 A1, whereby the entire conveyor belt is divided into finite segments, whereby each segment is provided with an unambiguous address, so that a segment marking is formed. The segments are delimited by a start marking, in each instance. The address of the segment marking is a transponder, for example, whereby the scanning unit in this regard comprises an antenna and a transponder reader device. The device is furthermore coupled with an opto-electronic system, which optically detects the belt surface, particularly the carrying side, in that it recognizes damage during operation, and shuts the system down when a critical state is reached, in order to initiate repair measures in timely manner.

The data carriers presented in greater detail above are already firmly affixed into the conveyor belt during its production, and can therefore not be replaced if damaged, or can only be replaced with great effort. In addition, transponders, in particular, are subject to failure and frequently have to be replaced.

The task of the invention now consists in making a conveyor belt available, in which the data carriers are introduced into the conveyor belt, already during production, in simple, fast, and operationally reliable manner, furthermore connected with quick replacement if the data carrier has become defective.

This task is accomplished in that the replaceable part is a segment that has a small area with reference to the entire carrying side and/or running side, and, in this connection, consists of a component carrier and a data carrier, whereby the component carrier and the data carrier form a total unit.

The advantageous embodiment variants of the component carrier are presented in greater detail in connection with FIGS. 2 to 6.

With regard to the data carrier as an integrated part of the component carrier, the following are preferably used:

The data carrier is a transponder, whereby reference is made to the transponder technology cited above.

The data carrier is a code, particularly under the aspect of a mechanical, optical, magnetic, electrically conductive, or radioactive detection. The code is particularly a bar code or is structured in the manner of a bar code. Also, the code can consist of small permanent magnets, particularly in the form of a serial circuit.

The data carrier is based on a thermochromic substance that brings about a color change in case of temperature changes within the critical temperature range of a conveyor belt. Inorganic or artificial pigments as well as polymer compounds having a color change characteristic are used. The polymer compound is, in particular, a polyacetylene. The thermochromic substance as a data carrier is preferably worked into a matrix, with fine distribution, which matrix is an integrated part of the component carrier. In this connection, the matrix generally consists of the same material as the component carrier.

Figure 2:
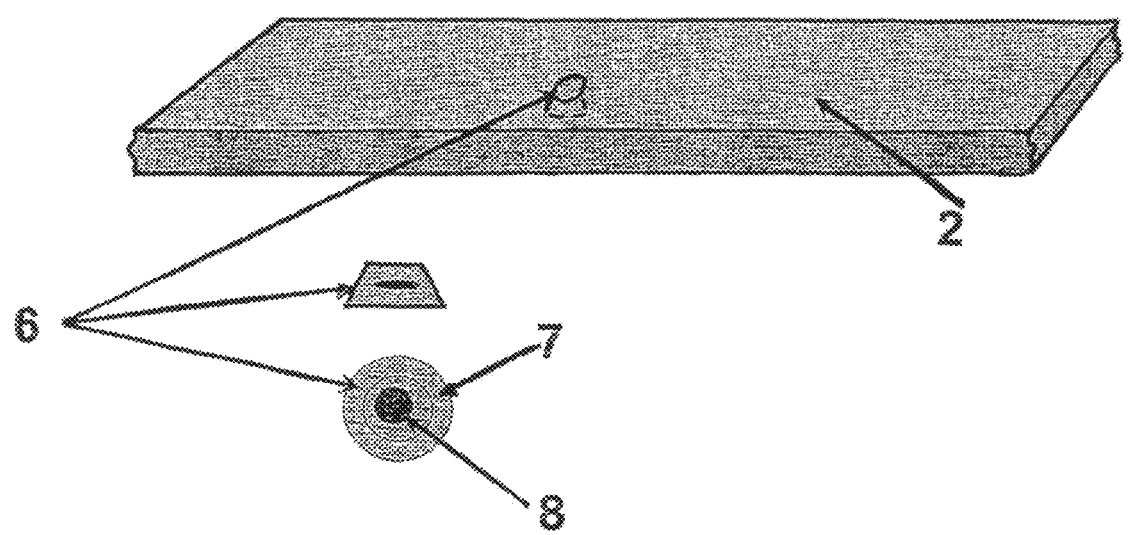
Figure 3:
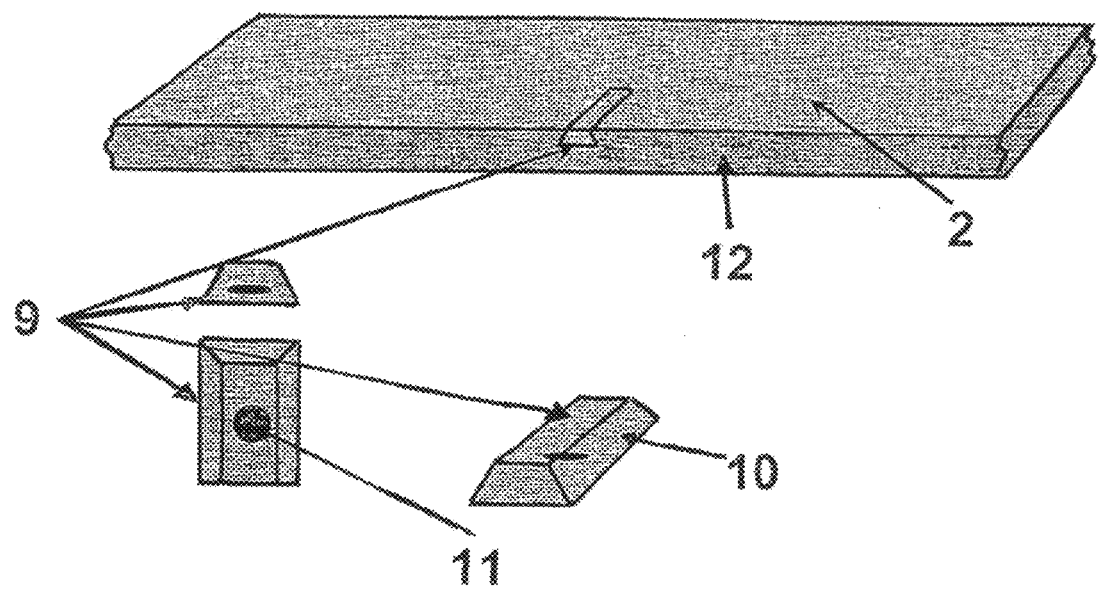
Figure 4:
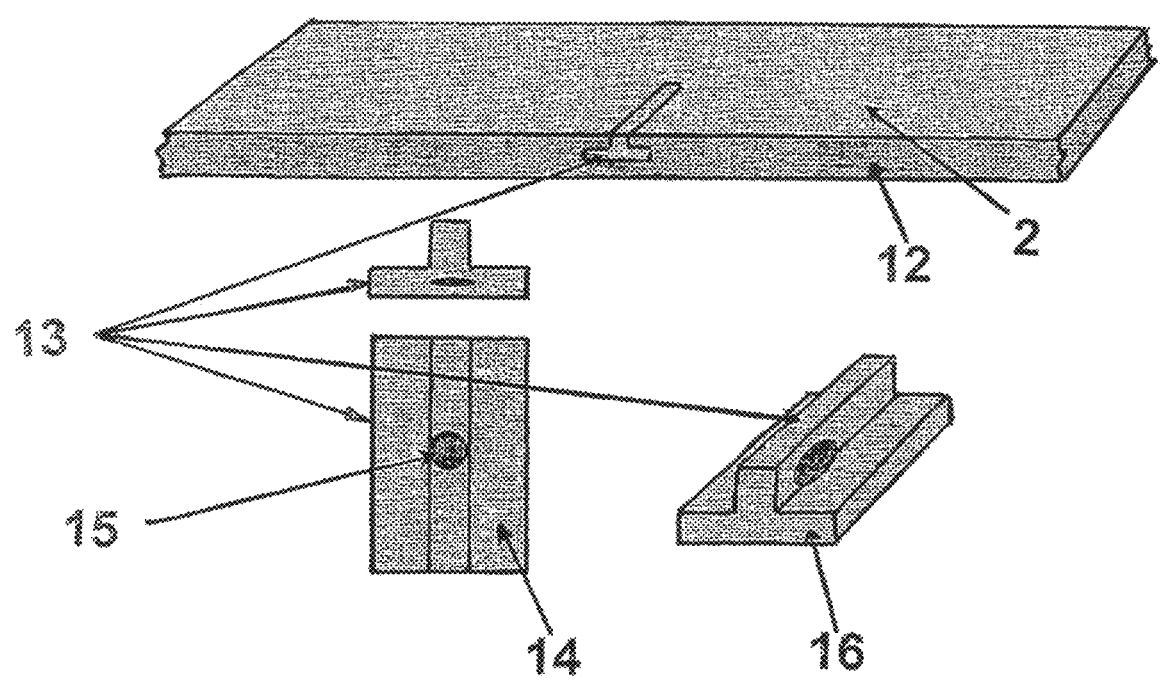
Figure 5:
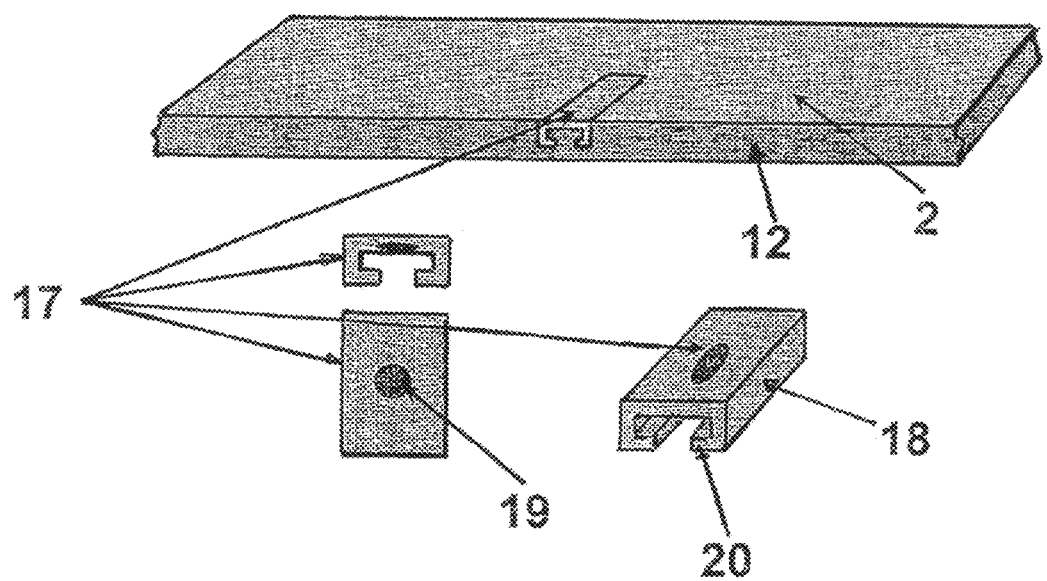
Figure 6:
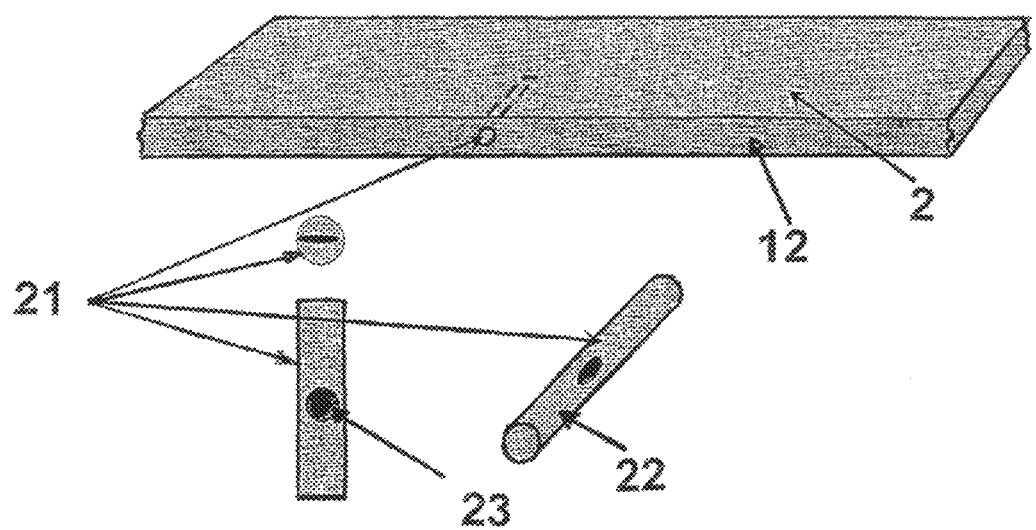

The invention will now be explained using exemplary embodiments, making reference to schematic drawings. These show:

FIG. 1 a detail of a conveyor belt having a carrying side, running side, and embedded strength support;

FIG. 2 a segment whose component carrier is configured as a disk;

FIG. 3 a segment whose component carrier is configured as a rod having a trapezoid cross-section shape;

FIG. 4 a segment whose component carrier is configured as a rod having a T-shaped cross-section shape;

FIG. 5 a segment whose component carrier is configured as a rod having a U-shaped cross-section shape;

FIG. 6 a segment whose component carrier is configured as a rod having a circular cross-section shape.

FIG. 1 shows a conveyor belt 1 having a longitudinal conveyor belt direction X and a crosswise conveyor belt direction Y. In this connection, the conveyor belt has a carrying side 2 and a running side 3. A strength support 5 in the form of a woven fabric tension support is embedded in the region of the conveyor belt core 4. Furthermore, the conveyor belt can have an embedded crosswise reinforcement (e.g. crosswise steel reinforcement).

The segment is now embedded within the carrying side 2 and/or the running side 3, whereby segment embedding into the carrying side is shown in FIGS. 2 to 6.

According to FIG. 2, the carrying side 2 is provided with a replaceable segment 6. In this connection, the segment consists of a component carrier (segment carrier) 7 and an integrated data carrier 8, in the form of a total unit (system). In this connection, the component carrier is the shaping element, and is configured as a disk here, whereby the essentially circular disk experiences an increase in diameter in the direction of the conveyor belt core 4 (FIG. 2). This results in an anchoring part in the direction of the conveyor belt core. The component carrier can be seen with reference to the surface of the carrying side. The data carrier 8 is now completely embedded in the component carrier 7, which can consist of an elastomer material, a thermoplastic elastomer (TPE), or a plastic. Embedding close to the surface is also possible. If the data carrier is formed from multiple fine particles, for example of metal or of a thermochromic substance in powder form or in a grain size, embedding into a matrix takes place first, specifically under the aspect of the most uniform distribution possible. In this connection, the matrix preferably consists of the same material as the component carrier, so that a total combination with material fit is formed.

Although the component carrier 7, and thus the segment 6, is firmly anchored within the cover plate 2 on the carrying side, the segment can be easily removed if damaged, because of the elasticity of the cover plate material, by means of a pliers-like tool, and replaced with a new segment.

According to FIG. 3, the segment 9 within the carrying side 2 comprises a component carrier 10 that is configured as a rod (strip) and runs in the crosswise direction Y of the conveyor belt, specifically starting from the conveyor belt edge 12. In this connection, the rod does not extend over the entire width of the conveyor belt. Because the rod possesses a trapezoid cross-section shape, effective anchoring of the component carrier takes place. Here, too, the component carrier can be seen with reference to the surface of the carrying side. With regard to the data carrier 11, complete embedding, or embedding close to the surface, within the component carrier, takes place.

Although the component carrier 10, and thus the segment 9, is firmly anchored within the cover plate 2 on the carrying side, the segment can be easily removed if damaged, because of the elasticity of the cover plate material, by means of a pliers-like tool, from the conveyor belt edge 12 and/or by way of the surface of the carrying side, and replaced with a new segment.

FIG. 4 shows a segment 13 integrated into the carrying side 2, the rod-shaped component carrier 14 of which has a T-shaped cross-section shape, and thus also undergoes effective anchoring, specifically by means of the two anchoring feet 16, which run in cord-like manner. The data carrier 15 can assume different positions within the component carrier. For the remainder, reference is made to the exemplary embodiment according to FIG. 3.

FIG. 5 shows a segment 17 within the carrying side 2, the rod-shaped component carrier 18 of which has a U-shaped cross-section shape, and thus also undergoes effective anchoring, specifically by means of the two anchoring claws 20 that run in cord-like manner. Here, the data carrier 19 is embedded particularly close to the surface of the component carrier. For the remainder, reference is made to the exemplary embodiment according to FIG. 3 here, as well.

According to FIG. 6, the segment 21 is completely embedded in the carrying side 2. Here, access with regard to replaceability exists only by way of the conveyor belt edge 12. The rod-shaped component carrier 22 has a circular cross-section shape here. With regard to the data carrier 23, complete embedding, or embedding close to the surface, takes place within the component carrier.

The segments shown in the exemplary embodiments according to FIG. 2 to 6 are configured with a small area with reference to the carrying side 2 and/or the running side 3. They therefore take up little space, specifically in a dimension range of mostly 100×100 mm.

In the longitudinal direction X of the conveyor belt (FIG. 1), multiple segments disposed at intervals from one another can be present, whereby the distance between two segments is essentially the same. In this connection, the distance amounts to between 10 m to 500 m.

REFERENCE SYMBOL LIST

1 conveyor belt
2 cover plate on the carrying side (carrying side)
3 cover plate on the running side (running side)
4 conveyor belt core
5 strength support
6 segment
7 component carrier
8 data carrier
9 segment
10 component carrier
11 data carrier
12 conveyor belt edge
13 segment
14 component carrier
15 data carrier
16 anchoring feet
17 segment
18 component carrier
19 data carrier
20 anchoring claws
21 segment
22 component carrier
23 data carrier
X longitudinal direction of conveyor belt
Y crosswise direction of conveyor belt

The invention claimed is:

1. A conveyor belt comprising:
an elastomer material, having a carrying side for the material to be conveyed, and a running side;
a conveyor belt core;
an embedded strength support disposed within the conveyor belt core;
at least one replaceable part, wherein the replaceable part is a segment that has a small area with reference to the entire carrying side and/or running side, and, in this connection, comprises a component carrier and a data carrier, whereby the component carrier and the data carrier form a total unit wherein the component carrier is a rod that runs in a crosswise direction Y of the conveyor belt wherein the rod-shaped component carrier has a trapezoid cross-section shape.

2. Conveyor belt according to claim 1, the segment is embedded in the carrying side and/or the running side.

3. Conveyor belt according to claim 1, wherein the component carrier is configured in such a manner that an anchoring part extends in the direction of the conveyor belt core.

4. Conveyor belt according to claim 1, wherein the rod-shaped component carrier runs from the conveyor belt edge in the crosswise direction Y of the conveyor belt.

5. Conveyor belt according to claim 1, wherein the rod-shaped component carrier does not extend over the entire width of the conveyor belt.

6. Conveyor belt according to claim 2, wherein the component carrier can be seen with reference to the surface of the carrying side and/or the running side.

7. Conveyor belt according to claim 1, wherein the component carrier consists of an elastomer material, a thermoplastic elastomer (TPE), or a plastic.

8. Conveyor belt according to claim 1, wherein the data carrier is completely embedded within the component carrier or disposed close to the surface.

9. Conveyor belt according to claim 1, wherein the data carrier is a transponder.

10. Conveyor belt according to claim 1, wherein the data carrier is a code, particularly under the aspect of a mechanical, optical, magnetic, electrically conductive, or radioactive detection.

11. Conveyor belt according to claim 10, wherein the code is a bar code or structured similar to a bar code.

12. Conveyor belt according to claim 10, wherein the code consists of small permanent magnets, particularly in the form of a serial circuit.

13. Conveyor belt according to claim 1, wherein the data carrier is based on a thermochromic substance that brings about a color change in case of temperature changes within the critical temperature range of a conveyor belt.

14. Conveyor belt according to claim 13, wherein the thermochromic substance is based on the basis of inorganic or artificial pigments having a color change characteristic.

15. Conveyor belt according to claim 13, wherein the thermochromic substance is based on a polymer compound having a color change characteristic.

16. Conveyor belt according to claim 15, wherein the polymer compound is a polyacetylene.

17. Conveyor belt according to claim 1, wherein the data carrier is worked into a matrix, which in turn is an integrated part of the component carrier.

18. Conveyor belt according to claim 1, wherein multiple segments are present in the longitudinal direction X of the conveyor belt, disposed at intervals.

19. Conveyor belt according to claim 18, wherein the distance between two segments is essentially the same.

20. Conveyor belt according to claim 18, wherein the distance amounts to 10 m to 500 m.

* * * * *